US009654320B2

(12) United States Patent
Garrido et al.

(10) Patent No.: US 9,654,320 B2
(45) Date of Patent: May 16, 2017

(54) METHOD OF TRANSMITTING INFORMATION BETWEEN A PLURALITY OF RADIOELECTRIC STATIONS AND ASSOCIATED TRANSMISSION NETWORK

(71) Applicant: THALES, Neuilly sur Seine (FR)

(72) Inventors: Eric Garrido, Gennevilliers (FR); David Lefranc, Gennevilliers (FR); Thibault De Moegen, Gennevilliers (FR)

(73) Assignee: THALES, Neuilly sur Seine (FR)

( * ) Notice: Subject to any disclaimer, the term of this patent is extended or adjusted under 35 U.S.C. 154(b) by 92 days.

(21) Appl. No.: 14/663,362

(22) Filed: Mar. 19, 2015

(65) Prior Publication Data

US 2015/0256371 A1  Sep. 10, 2015

Related U.S. Application Data

(63) Continuation of application No. PCT/EP2013/069530, filed on Sep. 19, 2013.

(30) Foreign Application Priority Data

Sep. 21, 2012 (FR) ...................... 12 02521

(51) Int. Cl.
  *H04W 4/00* (2009.01)
  *H04L 27/12* (2006.01)
  (Continued)

(52) U.S. Cl.
  CPC ............ *H04L 27/12* (2013.01); *H04J 1/065* (2013.01); *H04L 1/0041* (2013.01); *H04L 1/0045* (2013.01); *H04L 1/0057* (2013.01)

(58) Field of Classification Search
  CPC ............ H04L 27/12; H04L 1/06; H04L 1/065
  (Continued)

(56) References Cited

U.S. PATENT DOCUMENTS 7,203,718 B1* 4/2007 Fu .................. G06F 7/5446
                                              708/622
2001/0055311 A1* 12/2001 Trachewsky .......... H04L 1/0003
                                              370/445
(Continued)

FOREIGN PATENT DOCUMENTS

FR        2898000 A1    8/2007
WO     WO 85/01625 A1   4/1985
WO    WO 2012/098157 A2 7/2012

OTHER PUBLICATIONS

International Search Report dated Dec. 9, 2013 for International Patent Application No. PCT/EP2013/069530 filed on Sep. 19, 2013.

*Primary Examiner* — Farah Faroul
(74) *Attorney, Agent, or Firm* — Knobbe, Martens, Olson & Bear, LLP

(57) ABSTRACT

A method of transmitting information between a plurality of radioelectric stations and an associated transmission network are disclosed. In one aspect, the method transmits information between radioelectric stations, each station including a transmitter and a receiver, the information including NbMot words of data, NbMot being an integer >1. The transmission method includes: determining at least one polynomial of degree NbMot-1, each of the NbMot coefficients of the polynomial corresponding to a respective word, the polynomial having an indeterminacy, calculating NbRepet polynomial values for the polynomial, NbRepet being an integer >1, each polynomial value being calculated for a respective predetermined value of the indeterminacy, transmitting the calculated polynomial values from one radioelectric station to at least one other radioelectric station, receiving polynomial values by the other radioelectric station, and determining, via the other radioelectric station, the NbMot words from a Lagrange interpolation of the received polynomial values.

8 Claims, 2 Drawing Sheets

(51) Int. Cl.
*H04L 1/00* (2006.01)
*H04J 1/06* (2006.01)

(58) Field of Classification Search
USPC .......................................... 370/203
See application file for complete search history.

(56) References Cited

U.S. PATENT DOCUMENTS

2002/0150153 A1* 10/2002 Frenkel ................ H04L 7/0029
375/222
2009/0060064 A1 3/2009 Futaki et al.

* cited by examiner

METHOD OF TRANSMITTING INFORMATION BETWEEN A PLURALITY OF RADIOELECTRIC STATIONS AND ASSOCIATED TRANSMISSION NETWORK

INCORPORATION BY REFERENCE TO ANY PRIORITY APPLICATIONS

This application is a continuation of Application No. PCT/EP2013/069530, filed Sep. 19, 2013, which claims the benefit under 35 U.S.C. §119 of French Application No. 12 02521, filed Sep. 21, 2012, which are herein incorporated by reference in their entirety.

BACKGROUND

Field

The described technology generally relates to a method for transmitting information between a plurality of radioelectric stations, each station comprising a transmitter and a receiver, the information comprising NbMot words of data, NbMot being an integer strictly greater than 1. The described technology also relates to a transmission network comprising a plurality of radioelectric stations.

Description of the Related Technology

The described technology in particular relates to the case where the information to be transmitted has a size larger than the size of a radio packet dedicated to transporting that information. The described technology also relates to the case where it is necessary to repeat the sending of the information several times in order to guarantee, with a high likelihood, the minimum likelihood depending on the desired quality of service and for example equal to 0.99, the correct reception of at least one copy of said information.

The described technology in particular applies to a transmission network working by frequency hopping in a predetermined frequency plane, the frequency used for the data transmission being kept during a plateau, called a frequency hopping (FH) plateau, and changing from one FH plateau to another according to a frequency change law.

A transmission method of the aforementioned type is standard. The information to be transmitted is conveyed in a frame comprising NbMot data words $T_1, \ldots, T_{NbMot}$, and defined as follows:

$[T_1 \| T_2 \| \ldots \| T_{NbMot}]$, where $\|$ symbolizes a data concatenation.

The transmission of the frame is repeated several times in order to guarantee, with a high likelihood, the correct reception of at least one copy of the information. The transmission method comprises a synchronization mechanism between frames, to allow the receiving station to identify each transmitted frame correctly.

Due to the repetition, one of the NbMot words of the frame, such as the first word T1, also contains a frame indicator TPS, said indicator TPS evolving over the course of the repetitions and making it possible to number the frames successively transmitted.

A synchronization information then comprises the synchronization mechanism so that the receiving station recognizes the division into frames and the frame indicator TPS. Upon each repetition of the frame, the value, denoted TPS(i), of the frame indicator TPS evolves such that the receiving station globally knows how to position the received packet.

The transmitting station then transmits the data words $T_1, \ldots, T_{NbMot}$ in different packets as follows:

packet number 1 containing the first word $T_1$ with the frame indicator with value TPS(1),
packet number 2 containing the second word T2, . . . ,
packet number NbMot containing the word TNbMot, the packets numbered 1 to NbMot forming the first frame,
packet number NbMot+1 containing the first word $T_1$ with the frame indicator with value TPS(2),
packet number NbMot+2 containing the second word $T_2, \ldots,$
packet number 2×NbMot containing the word $T_{NbMot}$, the packets numbered NbMot+1 to 2×NbMot forming the second frame,
packet number 2×NbMot+1 containing the first word $T_1$ with the frame indicator with value TPS(3),
packet number 2×NbMot+2 containing the second word $T_2, \ldots$, and so forth up to a maximum number of frames, defined as a function of a likelihood that the receiving station will correctly obtain each of the data words $T_1, \ldots, T_{NbMot}$, that likelihood also being called quality of service.

The word $T_1$ with the frame indicator whose value TPS(i) evolves is repeated via packets having a number adjacent to 1 modulo NbMot. Likewise, the word $T_2$ is sent in packets having a number adjacent to 2 modulo NbMot, and so forth. The word $T_{NbMot}$ is repeated in packets having a number adjacent to 0 modulo NbMot.

Consequently, for the receiving station to obtain a copy of each word $T_1, \ldots, T_{NbMot}$, it must be able to correctly decode NbMot packets not necessarily belonging to the same frame, but each having a different number considering it modulo NbMot.

However, with such a transmission method, the maximum number of frames transmitted in order to guarantee the desired quality of service is high, and the transmission network is then particularly slow to transmit information.

SUMMARY OF CERTAIN INVENTIVE ASPECTS

One inventive aspect is a transmission method and network making it possible to reduce the quantity of data transmitted by the transmitting station to the receiving station(s), to convey said information comprising the data words $T_1, \ldots, T_{NbMot}$, while offering the same quality of service.

Another aspect is a transmission method of the aforementioned type, wherein the method comprises the following steps:
determining at least one polynomial of degree NbMot−1, each of the NbMot coefficients of the polynomial corresponding to a respective word, each polynomial having a variable,
calculating NbRepet polynomial values for each polynomial, NbRepet being an integer strictly greater than 1, each polynomial value being calculated for a respective predetermined value of the variable,
transmitting the calculated polynomial values from one radioelectric station to at least one other radioelectric station,
receiving polynomial values by each other radioelectric station, and
determining, via each other radioelectric station, the NbMot words from a Lagrange interpolation of the received polynomial values.

According to other advantageous aspects, the transmission method comprises one or more of the following features, considered alone or according to all technically possible combinations:
each word is divided into a plurality of patterns, and several polynomials are determined using the following equation:

$$P_w(X) = (T_{NbMot})_w + \sum_{j=1}^{NbMot-1} (T_j)_w \times X^j$$

with NbMot>1, 0≤w≤v and v≥1 and X designating the variable;
NbRepet data packets are successively transmitted during the transmission step;
the packets are defined as follows:

Paquet($i$)=$P_0((\alpha_0)^{NbRepet-1-i})\| \ldots \|P_v$
$((\alpha_w)^{NbRepet-1-i})\| \ldots \|P_v((\alpha_v)^{NbRepet-1-i})$ with NbRepet>1, 0≤i≤NbRepet-1, 0≤w≤v;
$(\alpha_w)^{NbRepet-1-i}$ designating the predetermined respective value of the variable to calculate the corresponding polynomial value, and
∥ symbolizing a data concatenation;
the method further comprises a step for calculating, via each station receiving said packets, time synchronization information for time synchronizing with the radioelectric station transmitting said packets, from polynomial values received and reception time deviations between the different received packets;
the NbMot data words have a same size equal to N bits, N being an integer strictly greater than 1;
one word among the NbMot data words comprises k bit(s) having a predetermined constant value, k being an integer with 1≤k≤N;
each word comprises at least one pattern, and each pattern represents an element of a mathematical field, such as a Galois field;
each respective predetermined value, for which a polynomial value is calculated, is a primitive element of said Galois field.

Another aspect is a network for transmitting information, the network comprising a plurality of radioelectric stations, each station comprising a transmitter and a receiver, the information comprising NbMot data words, NbMot being an integer strictly greater than 1,
wherein each station designed to transmit the information further comprises:
first means for determining at least one polynomial of degree NbMot-1, each of the NbMot coefficients of the polynomial corresponding to a respective word, each polynomial having a variable,
first means for calculating NbRepet polynomial values for each polynomial, NbRepet being an integer strictly greater than 1, each polynomial value being calculated for a respective predetermined value of the variable, and
means for transmitting the calculated polynomial values to at least one other radioelectric station,
and in that each station designed to receive the information further comprises:
means for receiving polynomial values, and
second means for determining the NbMot words from a Lagrange interpolation of the received polynomial values.

According to another advantageous aspect, the transmission network comprises the following feature:
each station designed to receive the information further comprises a second means for calculating time synchronization information for time synchronizing with the station designed to transmit the information, from the received polynomial values and reception time deviations between different received data packets, NbRepet data packets being able to be successively transmitted by the station intended to transmit the information.

BRIEF DESCRIPTION OF THE DRAWINGS

The features and advantages of the described technology will appear upon reading the following description, provided solely as a non-limiting example, and done in reference to the appended drawings, in which.

DETAILED DESCRIPTION OF CERTAIN INVENTIVE EMBODIMENTS

Figure 1:
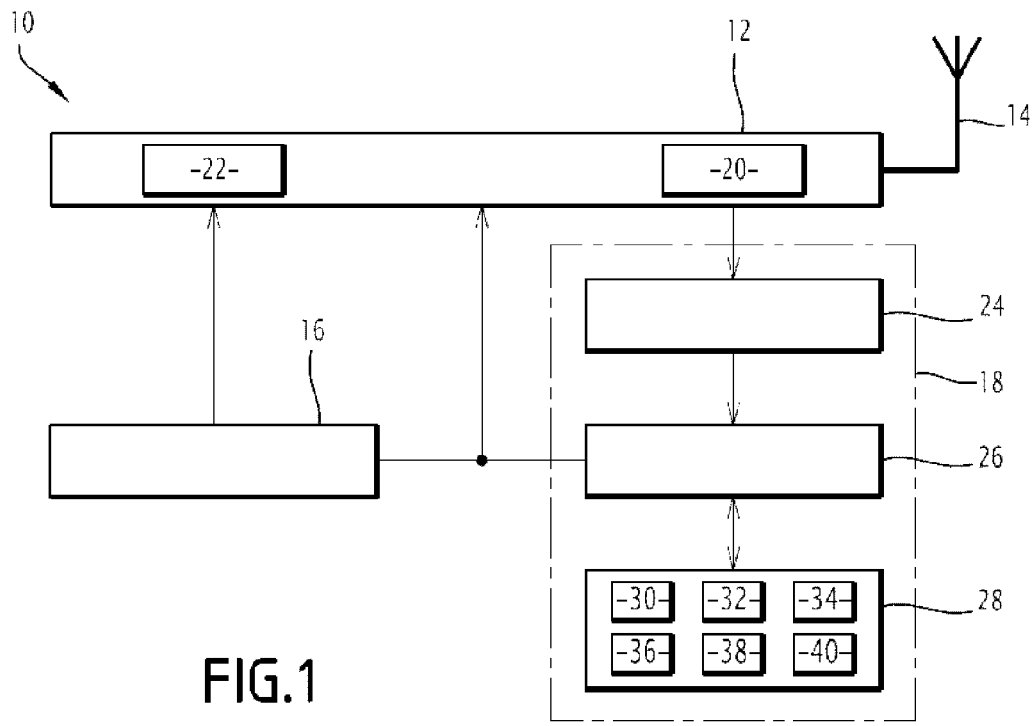
FIG. 1 is a diagrammatic illustration of a radioelectric station of a transmission network according to an embodiment.

A transmission network according to an embodiment comprises a plurality of radioelectric stations or radio stations 10, and is for example able to operate by frequency hopping. A radioelectric station 10 is illustrated in FIG. 1.
The transmission network is able to transmit, from one radioelectric station 10 to another radioelectric station 10, information, visible in FIG. 2, comprising NbMot data words $T_1, T_2, \ldots, T_{NbMot}$, NbMot being an integer strictly greater than 1. The radioelectric station 10 designed to transmit the information is hereinafter called the transmitting station, and the or each radioelectric station 10 designed to receive the information is hereinafter called the receiving station.
The set of frequencies usable by the transmission network comprises a frequency plane, also called an FH plane, for the frequency hopping operation. The FH plane for example belongs to the high frequency (HF) domain, between about 1.5 MHz and about 30 MHz. The FH plane is for example a predetermined frequency plane.
The number of radioelectric stations 10 is for example greater than or equal to three, each station 10 being able to transmit data in conference to the other stations 10 of the network.
As shown in FIG. 1, each station 10 comprises a transmission-reception chain 12, an antenna 14, a frequency synthesizer 16 and a processing unit 18.
The transmission-reception chain 12 is connected to the transmission-reception antenna 14, the frequency synthesizer 16 and the processing unit 18, the frequency synthesizer 16 and the processing unit 18 also being connected to each other.
The transmission-reception chain 12 comprises a device 20 for receiving radioelectric signals from the antenna 14 and a device 22 for transmitting radioelectric signals to the antenna 14. The transmission-reception chain 12 can be controlled in a known manner by the frequency synthesizer 16.

The processing unit 18 comprises an analog-digital converter 24 connected at the output of the reception device 20 of the transmission-reception chain, a microprocessor 26 connected at the output of the analog-digital converter 24, and a memory 28 connected to the microprocessor 26.

The analog-digital converter 24 is able to convert the voltage or current level provided by the reception device 20 into digital signal samples transmitted to the microprocessor 26.

The microprocessor 26 is connected to the frequency synthesizer 16 and the transmission-reception chain 12 for the transmission of radioelectric signals intended for other transmitters-receivers 10 of the transmission network.

In the described embodiment, each station 10 is configured to operate alternatively as a transmitting station and a receiving station.

For the operation of the station 10 as a transmitting station, the memory 28 is able to store a first software 30 for determining at least one polynomial $P_w(X)$, $0 \leq w \leq v$, of degree NbMot−1, each of the NbMot coefficients of the polynomial corresponding to a respective word, each polynomial having a variable X. The memory 28 is able to store a first program 32 for calculating NbRepet polynomial values $P_w((\alpha_w)^{NbRepet-1-i})$, $0 \leq w \leq v$, $0 \leq i \leq NbRepet-1$, for the or each polynomial $P_w(X)$, NbRepet being an integer strictly greater than 1, each polynomial value $P_w((\alpha_w)^{NbRepet-1-i})$ being calculated for a respective predetermined value $(\alpha_w)^{NbRepet-1-i}$ of the variable X. The memory 28 is also able to store a transmission program 34, intended for at least one other radioelectric station 10, for transmitting the calculated polynomial values $P_w((\alpha_w)^{NbRepet-1-i})$.

For the operation of the station 10 as a receiving station, the memory 28 is able to store a software 36 for receiving said polynomial values $P_w((\alpha_w)^{NbRepet-1-i})$ transmitted by a transmitting station 10, a second software 38 for determining the NbMot words $T_1, T_2, \ldots, T_{NbMot}$ from a Lagrange interpolation of the received polynomial values $P_w((\alpha_w)^{NbRepet-1-m})$.

The transmission method is for example carried out during a synchronization phase between several radioelectric stations 10. The synchronization phase corresponds to the transmission of a burst of elementary radio packets, i.e., a fixed number of elementary radio packets. The synchronization procedure is used primarily to transmit two types of information between the transmitting station and the receiving station, i.e., a technical datum necessary to decode the information and a time synchronization information t_final, the technical datum for example comprising the address of the transmitter, the address of the recipient, the type of data transmission services, security data, such as an integrity pattern, and cryptographic authentication. The time synchronization information allows the receiving station to position itself in the burst of received packets and to unambiguously deduce the start time of the transmission phase of the information that follows the synchronization phase.

Additionally, the memory 28 is able to store a second software 40 for calculating the time synchronization information t_final with the transmitting station 10, from the received polynomial values $P_w((\alpha_w)^{NbRepet-1-m})$ and reception time deviations between different received data packets Rm, with m an integer such that $0 \leq m \leq NbMot-1$, NbRepet data packets Paquet(i), $0 \leq i \leq NbRepet-1$, being able to be successively transmitted by the transmitting station 10.

Alternatively, each station 10 is configured to operate only as a transmitting station or only as a receiving station. The memory 28 of the transmitting station 10 then only comprises the first determination software 30, the first calculation software 32 and the transmission software 34. The memory 28 of each receiving station 10 then only comprises the reception software 36 and the second determination software 38. Additionally, the memory 28 of each receiving station 10 comprises the second calculation software 40.

Alternatively, the first determination means 30, the first calculation means 32, the transmission means 34, the reception means 36, the second determination means 38 and the second calculation means 40 are in the form of programmable logic components, or in the form of dedicated integrated circuits.

Figure 2:
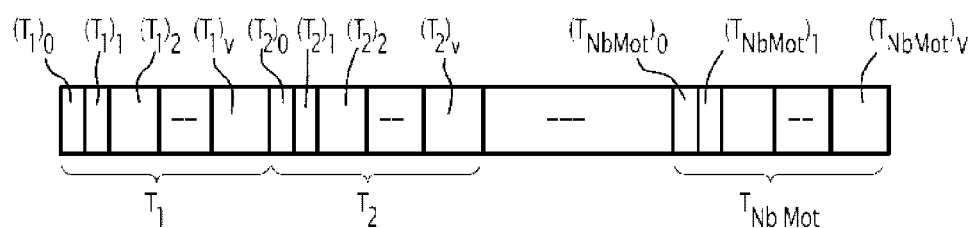
FIG. 2 is a diagrammatic illustration of the information to be transmitted comprising NbMot data words, NbMot being an integer strictly greater than 1.

The method for transmitting the information will now be described in light of FIGS. 2 to 4, FIG. 4 in particular illustrating a flowchart of the transmission method.

During step 100, the transmitting station 10 uses the first determination software 30 to determine at least one polynomial $P_w(X)$, $0 \leq w \leq v$, of degree NbMot−1, each of the NbMot coefficients of the polynomial $P_w(X)$ corresponding to a respective word $T_1, \ldots, T_{NbMot}$. The or each polynomial $P_w(X)$ comprises a variable X, the variable X preferably being unique for the or each polynomial $P_w(X)$, where w and v are integers.

Each word $T_1, \ldots, T_{NbMot}$ comprises at least one pattern $(T_j)_w$, $0 \leq w \leq v$, j being an integer such that $1 \leq j \leq NbMot$, and the or each pattern $(T_j)_w$ represents an element of a mathematical field, such as the Galois field.

The NbMot data words $T_1, T_2, \ldots, T_{NbMot}$ for example have the same size equal to N bits, N being an integer strictly greater than 1.

In the described example, one word, such as the first word $T_1$, among the NbMot data words $T_1, T_2, \ldots, T_{NbMot}$ comprises k bit(s) having a predetermined constant value CST, k being an integer with $1 \leq k \leq N$, k desirably being strictly greater than 1 and also such that NbRepet−1<$2^k$.

The k bits equal to CST for example represent an element of the Galois field GF($2^k$). Out of a concern for homogeneity with the rest of the description, k is denoted a(0) such that GF($2^k$) is equal to GF($2^{a(0)}$). $\alpha_0$ is a primitive element of the Galois field)) GF($2^{a(0)}$). The N-k other bits of the first word $T_1$ represent the succession of v elements respectively belonging to v bodies with form GF($2^{a(1)}$), \ldots, GF($2^{a(v)}$), v being an integer greater than or equal to 1, such that for any w, $1 \leq w \leq v$, $a(w) \geq k$, $$\sum_{w=1}^{v} a(w) = N - k \qquad (1)$$

In the specific case where v is equal to 1, the N-k bits represent an element of the field GF($2^{N-k}$).

$\alpha_1, \ldots, \alpha_v$ represent the v respective primitive elements of the v successive Galois bodies $GF(2^{a(1)}), \ldots, GF(2^{a(v)})$.

In the described example embodiment, each word $T_j$, $1 \le j \le NbMot$, is divided into v+1 patterns $(T_j)_w$, $0 \le w \le v$, v being greater than or equal to 1, each pattern $(T_j)_w$ being an element of a respective field $GF(2^{a(j)})$. Each word $T_j$ is then represented as follows:

$$T_j = (T_j)_0 \| (T_j)_1 \| (T_j)_2 \| \ldots \| (T_j)_v \quad (2)$$

In the particular case where the k first bits of the first word T1 are equal to CST, we also have: $(T_1)_0 = CST$.

The first determination software 30 then determines several polynomials $P_w(X)$, $0 \le w \le v$ and $v \ge 1$, using the following equation:

$$P_w(X) = (T_{NbMot})_w + \sum_{j=1}^{NbMot-1} (T_j)_w \times X^j \quad (3)$$

with NbMot>1, $0 \le w \le v$ and $v \ge 1$ and X designating the variable.

In the described example embodiment, the coefficients of each polynomial $P_w(X)$ belong to the Galois field $GF(2^{a(w)})$. Each of the NbMot coefficients $(T_j)_w$ of the polynomial $P_w(X)$ then corresponds to a respective pattern.

More specifically, the first determination software 30 then determines the v+1 following polynomials:

$$P_0(X) = (T_{NbMot})_0 + CST \cdot X + (T_2)_0 \cdot X^2 + \ldots + \quad (4)$$
$$(T_{NbMot-1})_0 \times X^{NbMot-1}$$
$$P_1(X) = (T_{NbMot})_1 + (T_1)_1 \cdot X + (T_2)_1 \cdot X^2 + \ldots +$$
$$(T_{NbMot-1})_1 \times X^{NbMot-1}$$
$$\ldots$$
$$P_v(X) = (T_{NbMot})_v + (T_1)_v \cdot X + (T_2)_v \cdot X^2 + \ldots +$$
$$(T_{NbMot-1})_v \times X^{NbMot-1}$$

During step 110, the transmitting station 10 uses the first calculation software 32 to determine NbRepet polynomial values $P_w((\alpha_w)^{NbRepet-1-i})$, $0 \le w \le v$, $0 \le i \le NbRepet-1$, for the or each polynomial $P_w(X)$, i being an integer, NbRepet being an integer strictly greater than 1. Each polynomial value $P_w((\alpha_w)^{NbRepet-1-i})$ is calculated for a respective predetermined value of the variable X.

Each respective predetermined value for which a polynomial value $P_w((\alpha_w)^{NbRepet-1-i})$ is calculated is, for example, the primitive element $(\alpha_w)^{NbRepet-1-i}$, $0 \le w \le v$, $0 \le i \le NbRepet-1$, of a respective Galois field $GF(2^{a(w)})$.

The calculation of the polynomial value $P_0((\alpha_0)^{NbRepet-1-i})$ corresponds to calculations in the Galois field $GF(2^{a(0)})$, i.e., in $GF(2^k)$. The calculation of the polynomial value $P_1((\alpha_1)^{NbRepet-1-i})$ corresponds to calculations in the Galois field $GF(2^{a(1)})$, and so forth.

During step 120, the transmitting station 10 next uses the transmission software 34 to transmit the calculated polynomial values $P_w((\alpha_w)^{NbRepet-1-i})$ to at least one other receiving station 10. The calculated polynomial values $P_w((\alpha_w)^{NbRepet-1-i})$ are for example transmitted in the form of NbRepet data packets Paquet(i), $0 \le i \le NbRepet-1$, transmitted successively.

The packets Pacquet(i) are for example defined as follows:

$$Paquet(i) = P_0((\alpha_0)^{NbRepet-1-i}) \| \ldots \| P_w((\alpha_w)^{NbRepet-1-i}) \| \ldots \| P_v((\alpha_v)^{NbRepet-1-i}) \quad (5)$$

with NbRepet>1, $0 \le i \le NbRepet-1$, $0 \le w \le v$, $(\alpha_w)^{NbRepet-1-i}$ designating the predetermined respective value of the variable to calculate the corresponding polynomial value, and ∥ symbolizing a data concatenation.

During step 130, the or each receiving station 10 receives packets $R_m$ containing said polynomial values $P_w((\alpha_w)^{NbRepet-1-m})$. This assumes that each receiving station 10 receives NbMot packets $R_0, R_1, \ldots, R_{NbMot-1}$, with the convention $R_m = Paquet(t(m))$, $t(m)$ designating the reception moment of the packet $R_m$, with $0 \le m \le NbMot-1$.

The or each receiving station 10 precisely knows the reception time deviations between the different packets $R_0, R_1, \ldots, R_{NbMot-1}$. These time deviations are denoted $d(n)$, $1 \le n \le NbMot-1$ and verify the following equations:

$$t(1) = t(0) + d(1),$$

$$t(2) = t(1) + d(2), \ldots,$$

$$t(NbMot-1) = t(NbMot-2) + d(NbMot-1) \quad (6)$$

In other words, the different reception moments $t(m)$ are defined as follows:

$$t(m) = t(NbMot-1) - \sum_{n=m+1}^{NbMot-1} d(n) \text{ or} \quad (7)$$

$$t(0) = t(NbMot-1) - d(1) - d(2) - \ldots - d(NbMot-1), \quad (8)$$
$$t(1) = t(NbMot-1) - d(2) - \ldots - d(NbMot-1), \ldots,$$
$$t(NbMot-2) = t(NbMot-1) - d(NbMot-1), \text{ and}$$
$$t(NbMot-1)$$

Each received packet $R_m$ is then written in the following form:

$$R_0 = \quad (9)$$
$$Paquet(t(0)) = P_0((\alpha_0)^{NbRepet-1-t(0)}) \| \ldots \| P_v((\alpha_v)^{NbRepet-1-t(0)})$$
$$R_1 = Paquet(t(1)) = P_0((\alpha_0)^{NbRepet-1-t(1)}) \| \ldots \| P_v((\alpha_v)^{NbRepet-1-t(1)})$$

$$\ldots \quad (10)$$

$$R_{NbMot-1} = Paquet(t(NbMot-1)) = P_0((\alpha_0)^{NbRepet-1-t(NbMot-1)})$$
$$\| \ldots \| P_v((\alpha_v)^{NbRepet-1-t(NbMot-1)})$$

which is rewritten in the form:

$$R_0 = P_0((\alpha_0)^{NbRepet-1-t(NbMot-1)+d(1)+\ldots+d(NbMot-1)}) \| \ldots \|$$
$$P_v((\alpha_v)^{NbRepet-1-t(NbMot-1)+d(1)+\ldots+d(NbMot-1)})$$
$$R_1 = P_0((\alpha_0)^{NbRepet-1-t(NbMot-1)+d(2)+\ldots+d(NbMot-1)}) \| \ldots \|$$
$$P_v((\alpha_v)^{NbRepet-1-t(NbMot-1)+d(2)+\ldots+d(NbMot-1)})$$

$$\ldots$$

$$R_{NbMot-2} = P_0((\alpha_0)^{NbRepet-1-t(NbMot-1)+d(NbMot-1)}) \| \ldots \|$$
$$P_v((\alpha_v)^{NbRepet-1-t(NbMot-1)+d(NbMot-1)})$$
$$R_{NbMot-1} = P_0((\alpha_0)^{NbRepet-1-t(NbMot-1)}) \| \ldots \|$$
$$P_v((\alpha_v)^{NbRepet-1-t(NbMot-1)})$$

The time synchronization information t_final is defined by the equation:

$$t\_final = NbRepet - 1 - t(NbMot-1) \quad (11)$$

The second determination software 38 then determines, by Lagrange interpolation, v+1 polynomials $Q_w(X)$ of degree NbMot−1, with 0≤w≤v and v≥1, using the following equation:

$$Q_w(X) = \qquad (12)$$
$$P_w((\alpha_w)^{t\_final} X) = (T_{NbMot})_w + \sum_{j=1}^{NbMot-1} (\alpha_w)^{t\_final \times j} \times (T_j)_w \times X^j$$

According to the preceding, the NbMot packets $R_0, R_1, \ldots, R_{NbMot-1}$ are then written $$R_0 = Q_0((\alpha_0)^{d(1)+\ldots+d(NbMot-1)}) \| \ldots \| Q_v((\alpha_v)^{d(1)+\ldots+d(NbMot-1)})$$
$$R_1 = Q_0((\alpha_0)^{d(2)+\ldots+d(NbMot-1)}) \| \ldots \| Q_v((\alpha_v)^{d(2)+\ldots+d(NbMot-1)})$$
$$\ldots$$
$$R_{NbMot-2} = Q_0((\alpha_0)^{d(NbMot-1)}) \| \ldots \| Q_v((\alpha_v)^{d(NbMot-1)})$$
$$R_{NbMot-1} = Q_0(1) \quad \| \ldots \| Q_v(1)$$

In the described example embodiment, the coefficients of each polynomial $Q_w(X)$ belong to the Galois field $GF(2^{a(w)})$.

More specifically, the second determination software 38 then determines the v+1 following polynomials:

$$Q_0(X) = (T_{NbMot})_0 + CST(\alpha_0)^{t\_final}X + (T_2)_0(\alpha_0)^{t\_final \times 2}X^2 + \ldots + (T_{NbMot-1})_0(\alpha_0)^{t\_final \times (NbMot-1)}X^{NbMot-1} \qquad (13)$$
$$Q_1(X) = (T_{NbMot})_1 + (T_1)_1(\alpha_1)^{t\_final}X + (T_2)_1(\alpha_1)^{t\_final \times 2}X^2 + \ldots + (T_{NbMot-1})_1(\alpha_1)^{t\_final \times (NbMot-1)}X^{NbMot-1}$$
$$\ldots$$
$$Q_v(X) = (T_{NbMot})_v + (T_1)_v(\alpha_v)^{t\_final}X + (T_2)_v(\alpha_v)^{t\_final \times 2}X^2 + \ldots + (T_{NbMot-1})_v(\alpha_v)^{t\_final \times (NbMot-1)}X^{NbMot-1}$$

Each coefficient of the polynomial $Q_w(X)$ for the term $X^j$ of degree j is denoted $Coeff(Q_w(X), j)$, and each polynomial $Q_w(X)$ is then written:

$$Q_w(X) = (T_{NbMot})_w + \sum_{j=1}^{NbMot-1} Coeff(Q_w(X), j) X^j \qquad (14)$$

The second calculation software 40 then calculates the time synchronization information t_final using the coefficient $Coeff(Q_0(X), 1)$, the latter verifying, according to equations (12) and (14), the following equation:

$$Coeff(Q_0(X),1) = (\alpha_0)^{t\_final}(T_1)_0 = (\alpha_0)^{t\_final}CST \qquad (15)$$

Consequently, the quantity $(\alpha_0)^{t\_final}$ is found by calculating the quantity $Coeff(Q_0(X),1)/CST$ in the Galois field $GF(2^k)$. The value k being relatively small, the second calculation software 40 is then able to find the time synchronization information t_final from the value $(\alpha_0)^{t\_final}$, for example using a match table between the elements $(\alpha_0)^m$ and m, or via an exhaustive search on the few possible values of the time synchronization information t_final.

Figure 3:
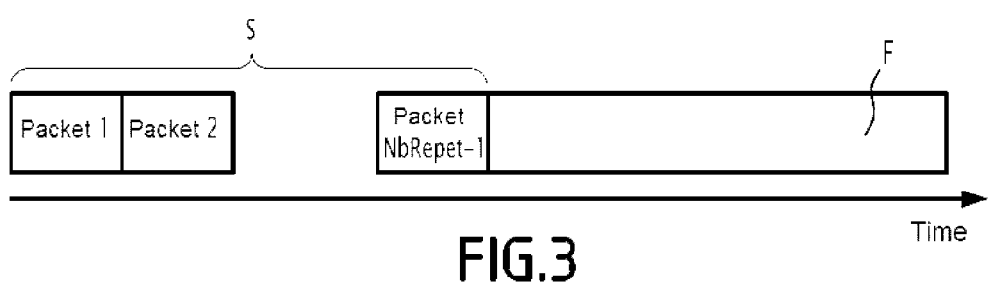
FIG. 3 is a diagrammatic illustration of the successive transmission of NbRepet data packets, NbRepet being an integer strictly greater than 1.
Figure 4:
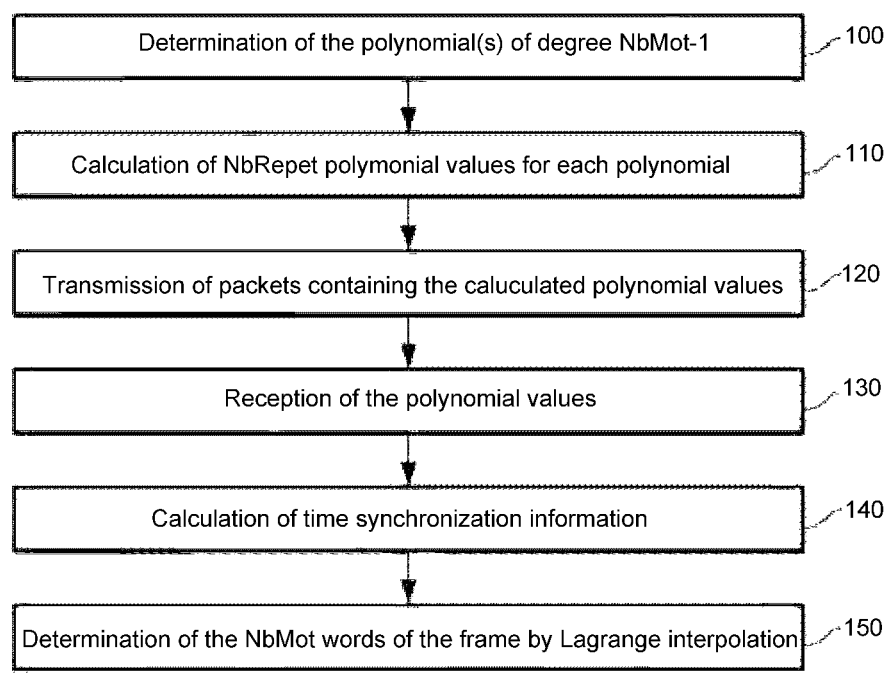
FIG. 4 is a flowchart of a method for transmitting information according to an embodiment.

The receiving station 10 then knows, at the end of the transmission of the NbRepet−1 data packets Paquet(m) for example corresponding to a synchronization phase S, to position itself exactly on a successive communication phase F, as shown in FIG. 3. The communication phase F for example allows the transmission of a useful information flow at the end of the synchronization phase S.

During step 150, the second determination software 38 lastly determines the value of each of the NbMot words $T_1, T_2, \ldots, T_{NbMot}$ from the Lagrange interpolation of the received polynomial values $P_w((\alpha_w)^{NbRepet-1-i})$.

From the coefficients of each of the v+1 polynomials $Q_w(X)$, 0≤w≤v, the second determination software 38 obtains the word $T_{NbMot}$ equivalent to:

$$T_{NbMot} = (T_{NbMot})_0 \|(T_{NbMot})_1\|(T_{NbMot})_2\| \ldots \|(T_{NbMot})_v \qquad (16)$$

For the other words $T_j$, 0≤j≤NbMot−1, the second determination software 38, knowing the value $(\alpha_0)^{t\_final}$, determines each pattern $(T_j)_w$ from each polynomial $Q_w(X)$ using the following equation:

$$(T_j)_w = \frac{Coeff(Q_w(X), j)}{(\alpha_w)^{t\_final \times j}} \qquad (17)$$

the value of $(\alpha_w)^{t\_final}$ being calculated from the known value of the primitive element $\alpha_w$ and the value of the time synchronization information t_final previously calculated.

In other words, each word $T_j$ is, according to equations (2) and (17), determined as follows:

$$T_j = \frac{Coeff(Q_0(X), j)}{(\alpha_0)^{t\_final \times j}} \left\| \frac{Coeff(Q_1(X), j)}{(\alpha_1)^{t\_final \times j}} \right\| \ldots \left\| \frac{Coeff(Q_v(X), j)}{(\alpha_v)^{t\_final \times j}} \right. \qquad (18)$$

As an example, the transmission method is described below in the particular case where NbMot is equal to 2 and the integer number v is equal to 1.

The information that must be transmitted has a size of 2×N bits. Assuming that the constant value CST is located on the first k bits of the first word T1, the first and second words to be transmitted $T_1, T_2$ are then written:

$$T_1 = CST\|(T_1)_1 \qquad (19)$$

where CST is an element of the Galois field $GF(2^k)$ and $(T_1)_1$ is an element of the Galois field $GF(2^{N-k})$, and $$T_2 = (T_2)_0\|(T_2)_1 \qquad (20)$$

where $(T_2)_0$ is an element of the Galois field $GF(2^k)$ and $(T_2)_1$ is an element of the Galois field $GF(2^{N-k})$.

The first determination software 30 then determines the following two polynomials $P_0(X)$ and $P_1(X)$ of degree 1:

$$P_0(X) = (T_2)_0 + CST \times X$$
$$P_1(X) = (T_2)_1 + (T_1)_1 \times X$$
$$P_0(X) = (T_2)_0 + CST \cdot X$$
$$P_1(X) = (T_2)_1 + (T_1)_1 \cdot X \qquad (21)$$

$P_0(X)$ being defined in the Galois field $GF(2^k)$ and $P_1(X)$ being defined in the Galois field $GF(2^{N-k})$.

The transmitted NbRepet packets Paquet(i) are then the following:

$$Paquet(0) = P_0((\alpha_0)^{NbRepet-1}) \| P_1((\alpha_1)^{NbRepet-1}) \quad (22)$$

$$Paquet(1) = P_0((\alpha_0)^{NbRepet-2}) \| P_1((\alpha_1)^{NbRepet-2})$$

$$\ldots$$

$$Paquet(NbRepet-2) = P_0(\alpha_0) \| P_1(\alpha_1)$$

$$Paquet(NbRepet-1) = P_0(1) \| P_1(1)$$

In reception, it is then assumed that the receiving station 10 receives NbMot packets, i.e., 2 packets $R_0$ and $R_1$, at respective moments t0 and t1, with t1 equal to t0+d, where d represents the time deviation between the two received packets, that time deviation d being known by the receiving station 10.

The first received packet $R_0$ verifies:

$$R_0 = Paquet(t0) = P_0((\alpha_0)^{NbRepet-1-t0}) \| P_1((\alpha_1)^{NbRepet-1-t0}) \quad (23)$$

which is written in the form $$R_0 = P_0((\alpha_0)^{NbRepet-1-t1}(\alpha_0)^d) \| P_1((\alpha_1)^{NbRepet-1-t1}(\alpha_1)^d) = Q_0((\alpha_0)^d) \| Q_1((\alpha_1)^d) \quad (24)$$

given that $$t1 = t0 + d \quad (25)$$

The second received packet $R_1$ verifies:

$$R_1 = Paquet(t1) = P_0((\alpha_0)^{NbRepet-1-t1}) \| P_1((\alpha_1)^{NbRepet-1-t1}) \quad (26)$$

which is written in the form $$R_1 = P_0((\alpha_0)^{NbRepet-1-t1}(\alpha_0)^0) \| P_1((\alpha_1)^{NbRepet-1-t1}(\alpha_1)^0) = Q_0(1) \| Q_1(1) \quad (27)$$

The receiving station 10 reconstructs the polynomials by Lagrange interpolation:

$$Q_0(X) = Coeff(Q_0(X),0) + Coeff(Q_0(X),1) \times X = P_0((\alpha_0)^{NbRepet-1-t1} \times X) \quad (28)$$

$$Q_1(X) = Coeff(Q_1(X),0) + Coeff(Q_1(X),1) \times X = P_1((\alpha_1)^{NbRepet-1-t1} \times X) \quad (29)$$

The receiving station 10 deduces, by polynomial identification, that $$T_2 = Coeff(Q_0(X),0) \| Coeff(Q_1(X),0) \quad (30)$$

and that $$Coeff(Q_0(X),1) = (\alpha_0)^{NbRepet-1-t1}(T_1)_0 = (\alpha_0)^{NbRepet-1-t1} CST \quad (31)$$

then that $$Coeff(Q_1(X),1) = (\alpha_1)^{NbRepet-1-t1}(T_1)_1 \quad (32)$$

The receiving station 10 then deduces the value of NbRepet−1−t1 from equation (31), then the value of the pattern $(T_1)_1$ from the following equation (32):

$$(T_1)_1 = \frac{Coeff(Q_1(X), 1)}{(\alpha_1)^{NbRepet-1-t1}} \quad (33)$$

The transmission method and the transmission network according to the described technology makes it possible to transmit the information comprising the data words $T_1, \ldots, T_{nbMot}$, between a transmitting station 10 and one or more receiving stations 10 via the transmission of only NbRepet data packets Paquet(i), while guaranteeing the desired quality of service.

As a comparison, for a same quality of service and for a same size of the transmitted packets, the transmission method according to the described technology requires a number of transmitted packets approximately 2.5 times lower than the number of transmitted packets necessary with the standard transmission method.

Furthermore, the transmission method according to the described technology also makes it possible to calculate the time synchronization information t_final quite simply.

One can thus see that the transmission method and network according to the described technology makes it possible to reduce the quantity of data transmitted by the transmitting station to the receiving station(s), to convey said information comprising the data words $T_1, \ldots, T_{nbMot}$, while offering the same quality of service as the transmission method of the state of the art.

The transmission network according to the invention is thus particularly faster for transmitting the information.

While there have been shown and described and pointed out the fundamental novel features of the invention as applied to certain inventive embodiments, it will be understood that the foregoing is considered as illustrative only of the principles of the invention and not intended to be exhaustive or to limit the invention to the precise forms disclosed. Naturally, modifications and variations are within the scope of the invention as determined by the appended claims when interpreted in accordance with the breadth to which they are entitled.

What is claimed is:

1. A method for transmitting information between a plurality of radioelectric stations, each of the radioelectric stations comprising a transmitter and a receiver, the information comprising NbMot words of data, NbMot being an integer strictly greater than 1, the method comprising:
   determining at least one polynomial of degree NbMot−1, each of the NbMot coefficients of the polynomial corresponding to a respective one of the words, the polynomial having a variable;
   calculating NbRepet polynomial values for the polynomial, NbRepet being an integer strictly greater than 1, each of the polynomial values being calculated for a respective predetermined value of the variable;
   transmitting the calculated polynomial values from a first radioelectric station to at least one second radioelectric station, wherein NbRepet data packets are successively transmitted during the transmission;
   receiving polynomial values by the second radioelectric station;
   determining, via the second radioelectric station, the words from a Lagrange interpolation of the received polynomial values; and
   calculating, via the second radioelectric station receiving the packets, time synchronization information for time synchronizing with the first radioelectric station transmitting the packets, from the received polynomial values and reception time deviations between the different received packets.

2. The method according to claim 1, wherein each of the words is divided into a plurality of patterns, and wherein several of the polynomials are determined using the following equation:

$$P_w(X) = (T_{NbMot})_w + \sum_{j=1}^{NbMot-1} (T_j)_w \times X^j$$

with NbMot>1, $0 \leq w \leq v$ and $v \geq 1$, j being an index designating a respective one of the words and X designating the variable.

3. The method according to claim 1, wherein the packets are defined as follows:

Paquet(i)=$P_0((\alpha_0)^{NbRepet-1-i})\| \ldots \|P_w((\alpha_w)^{NbRepet-1-i})\| \ldots \|P_v((\alpha_v)^{NbRepet-1-i})$ with NbRepet>1, $0 \leq i \leq NbRepet-1$, $0 \leq w \leq v$, $P_w$ designating a respective polynomial, $(\alpha w)NbRepet-1-i$ designating the predetermined respective value of the variable to calculate the corresponding polynomial value, and $\|$ symbolizing a data concatenation.

4. The method according to claim 1, wherein the data words each have the same size equal to N bits, N being an integer strictly greater than 1.

5. The method according to claim 4, wherein one word of the data words comprises k bit(s) having a predetermined constant value, k being an integer with $1 \leq k \leq N$.

6. The method according to claim 1, wherein each of the words comprises at least one pattern, and wherein the pattern represents an element of a mathematical field.

7. The method according to claim 6, wherein each of the respective predetermined values for which a polynomial value is calculated is a primitive element of the Galois field.

8. A network for transmitting information, the network comprising a plurality of radioelectric stations, each of the radioelectric stations comprising a transmitter and a receiver, the information comprising NbMot words of data, NbMot being an integer strictly greater than 1, wherein each of the radioelectric stations designed to transmit the information further comprises:

means for determining at least one polynomial of degree NbMot−1, each of the NbMot coefficients of the polynomial corresponding to a respective one of the words, the polynomial having a variable;

means for calculating NbRepet polynomial values for the polynomial, NbRepet being an integer strictly greater than 1, each of the polynomial values being calculated for a respective predetermined value of the variable; and means for transmitting the calculated polynomial values to at least one other radioelectric station, wherein each of the stations designed to receive the information further comprises:

means for receiving the polynomial values;

means for determining the words from a Lagrange interpolation of the received polynomial values;

means for calculating time synchronization information for time synchronizing with the station designed to transmit the information, from the received polynomial values; and reception time deviations between different received packets, the station designed to transmit the information configured to successively transmit NbRepet data packets.

* * * * *